B. H. POTTER.
ATTACHMENT FOR POTATO DIGGERS.
APPLICATION FILED DEC. 8, 1910.

1,005,304.

Patented Oct. 10, 1911.
5 SHEETS—SHEET 1.

Witnesses

Inventor
Bret H. Potter

Attorneys

B. H. POTTER.
ATTACHMENT FOR POTATO DIGGERS.
APPLICATION FILED DEC. 8, 1910.

1,005,304.

Patented Oct. 10, 1911.
5 SHEETS—SHEET 2.

Witnesses

Inventor
Bret H. Potter

By

Attorneys

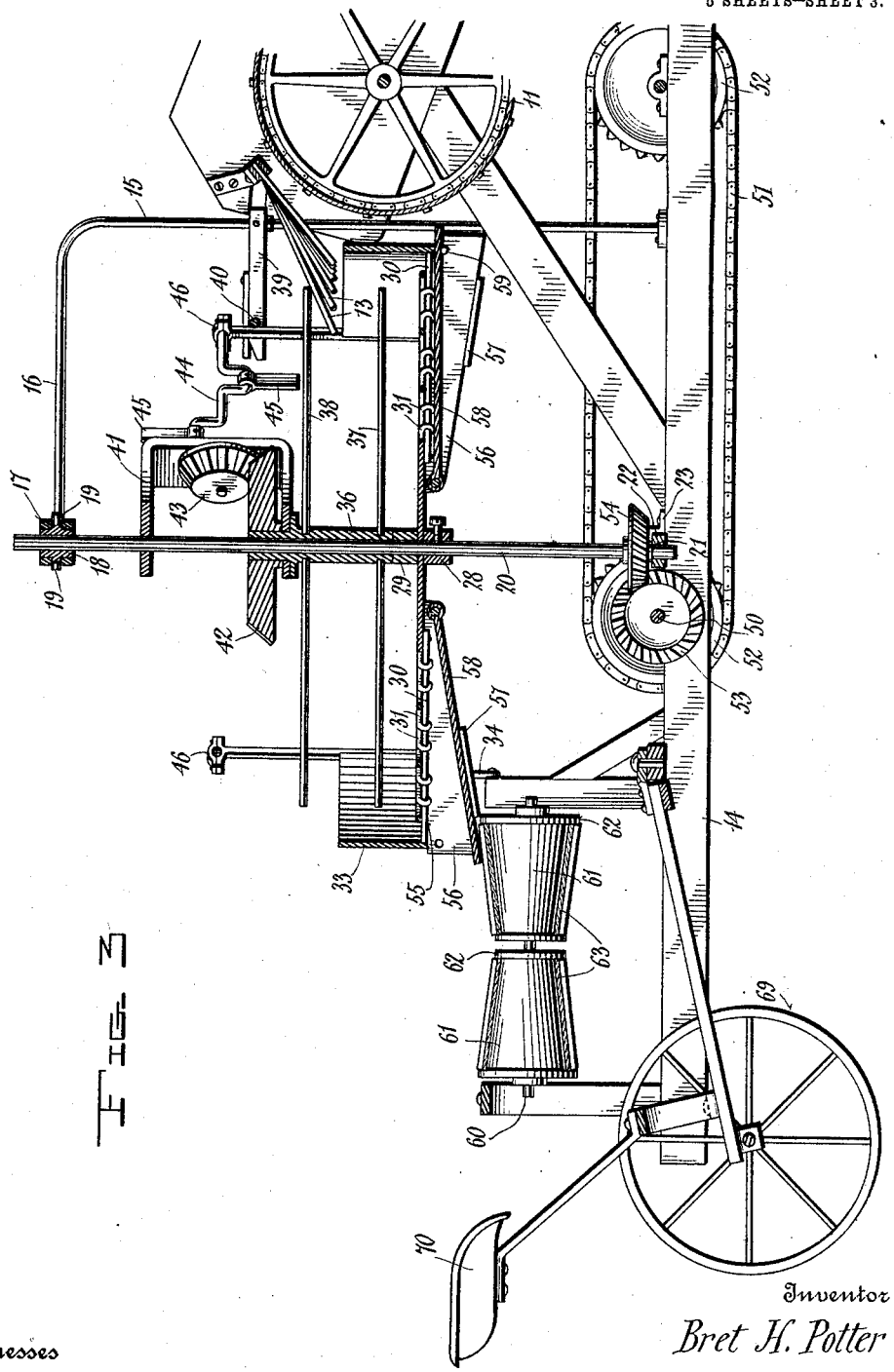

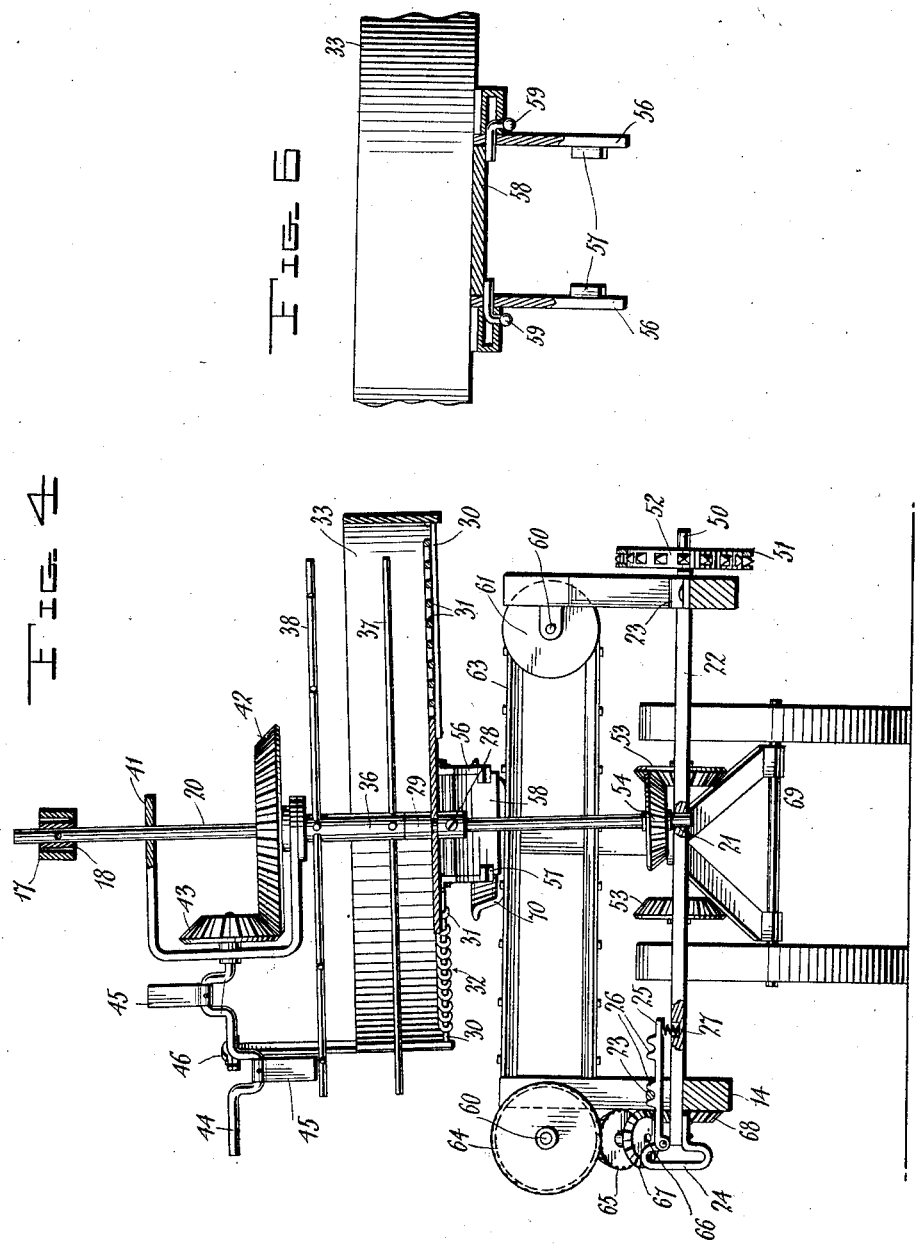

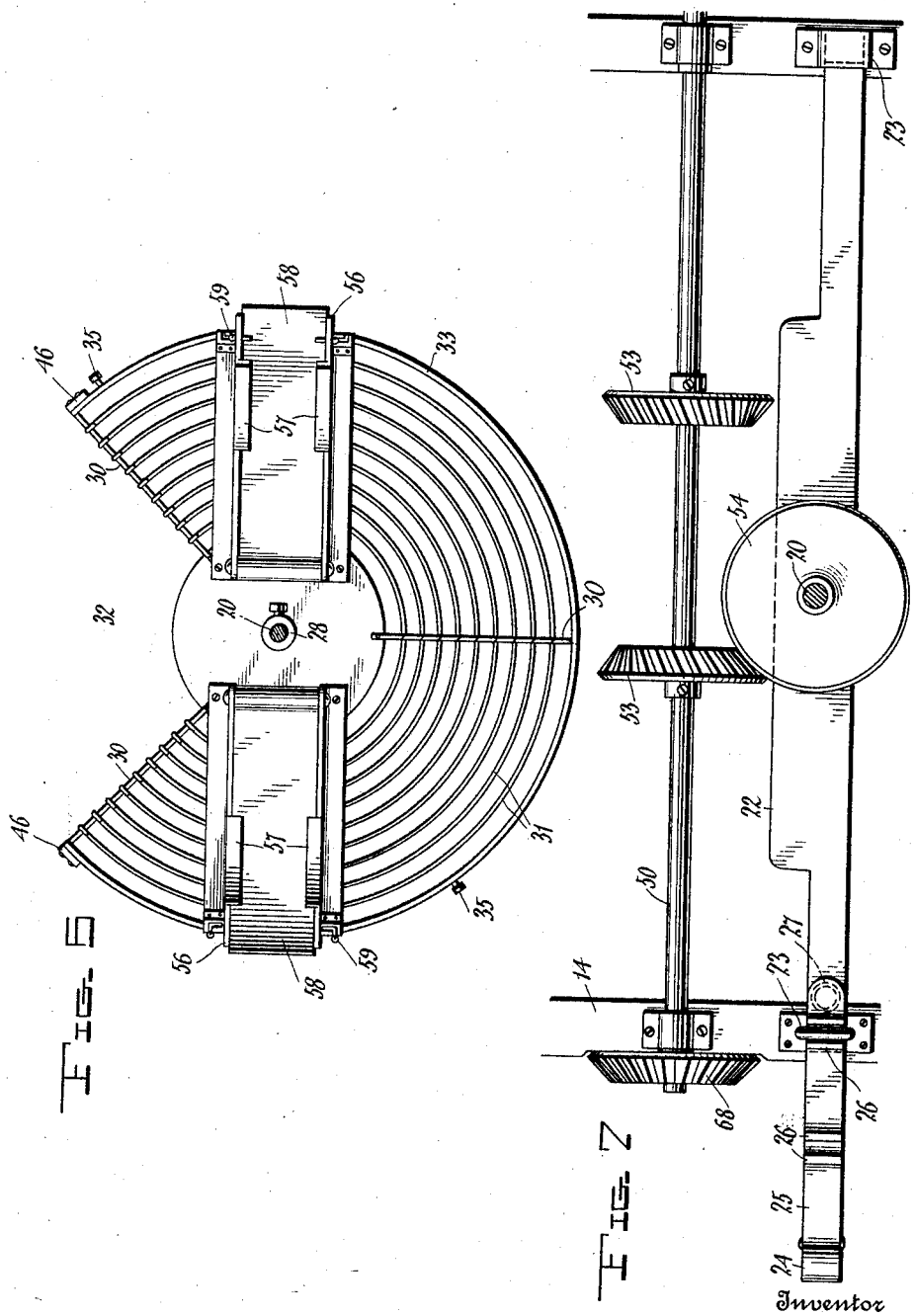

UNITED STATES PATENT OFFICE.

BRET H. POTTER, OF WYTOPITLOCK, MAINE.

ATTACHMENT FOR POTATO-DIGGERS.

1,005,304.    Specification of Letters Patent.    Patented Oct. 10, 1911.

Application filed December 8, 1910. Serial No. 596,284.

*To all whom it may concern:*

Be it known that I, BRET H. POTTER, a citizen of the United States, residing at Wytopitlock, in the county of Aroostook, State of Maine, have invented certain new and useful Improvements in Attachments for Potato-Diggers; and I do hereby declare the following to be a full, clear, and exact description of the invention, such as will enable others skilled in the art to which it appertains to make and use the same.

This invention relates to potato diggers and has special reference to an attachment for devices of this character arranged to separate the potatoes from the plants and to clean the earth from the potatoes and deposit them in a suitable receptacle.

One object of the invention is to provide an improved arrangement of cleaning screen for devices of this character, the screen being so constructed that the potato tops may be delivered from either side of the machine so that it can be driven across the field in such manner as to always discharge the tops on that portion of the field which has already been worked over.

A second object of the invention is to provide an improved beater arrangement especially adapted for use in connection with the improved screen.

A third object of the invention is to provide a horizontal screen having an improved means for tilting the screen and for actuating conveyer arms moving over said screen.

A fourth object of the invention is to provide an improved form of delivery chute especially adapted for use in connection with screens of this character.

With the above objects in view the invention consists in general of certain novel details of construction and combinations of parts hereinafter fully described, illustrated in the accompanying drawings, and specifically set forth in the claims.

Figure 1:
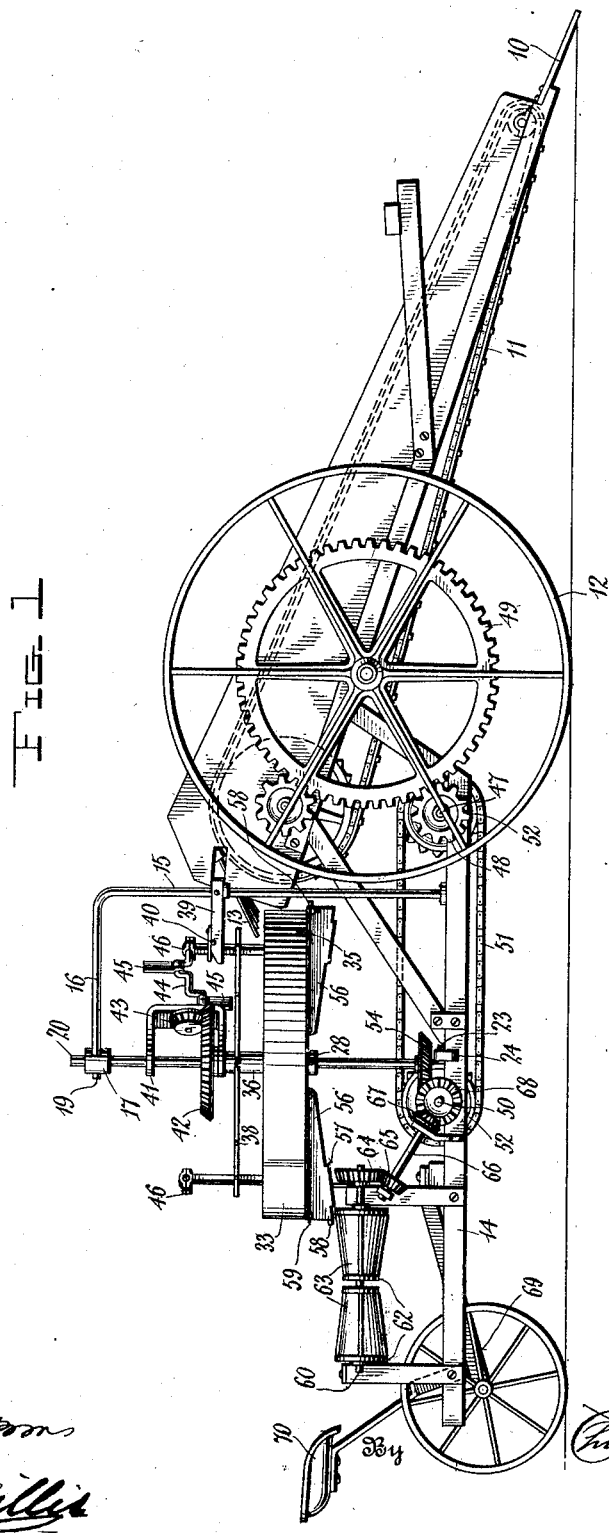
Figure 2:
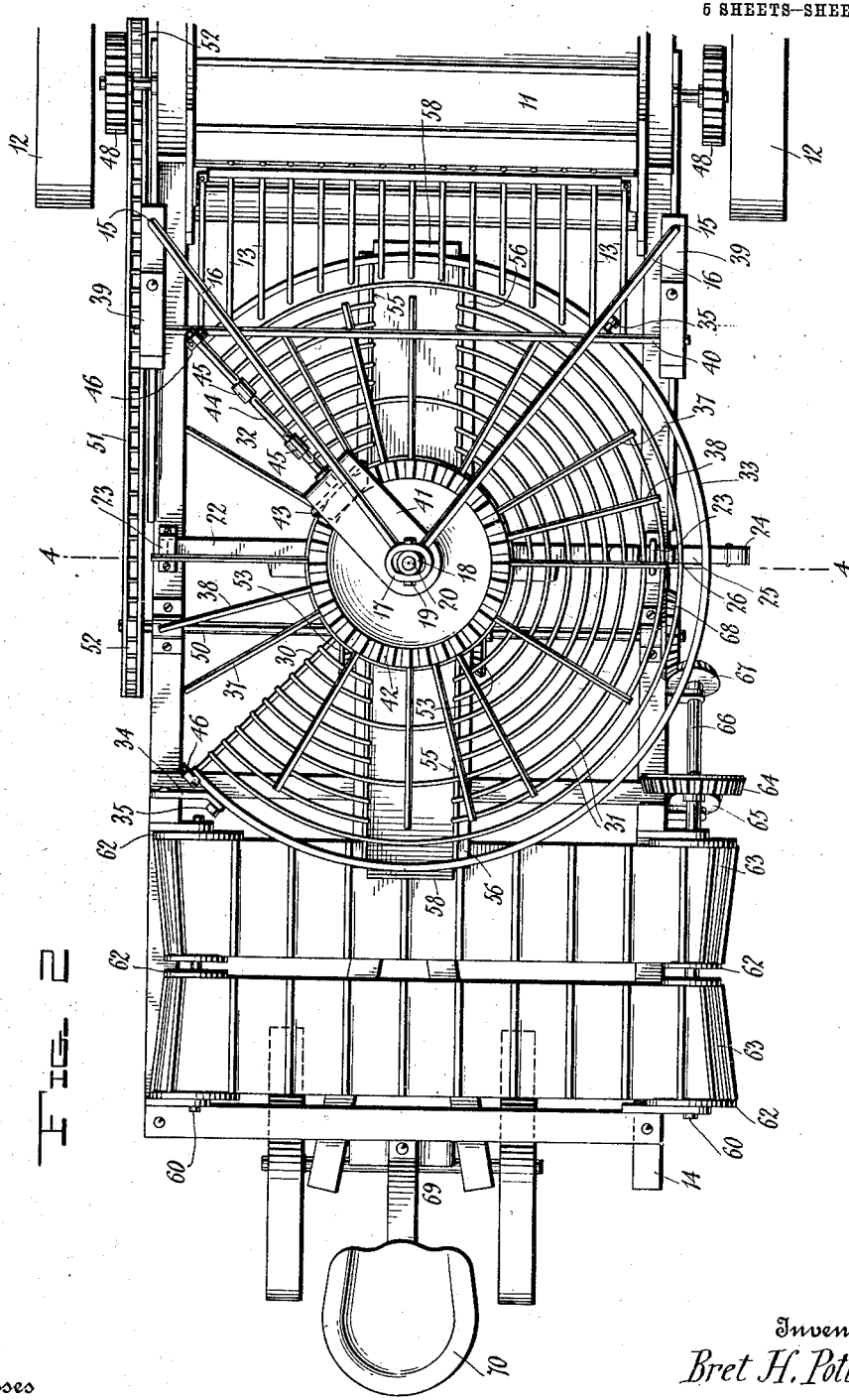

In the accompanying drawings, like characters of reference indicate like parts in the several views, and; Figure 1 is a side elevation of a potato digger with the improved attachment applied thereto. Fig. 2 is an enlarged detail plan view of the attachment, the view showing a portion only of the potato digger. Fig. 3 is a vertical longitudinal median section of the device as shown in Fig. 2. Fig. 4 is a section on the line 4—4 of Fig. 2, the screen and beater being shown arranged for delivery from the side opposite to the delivery side of said figure. Fig. 5 is a bottom view of the cleaning screen and its delivery chutes. Fig. 6 is an enlarged detail view taken from the end of one of the delivery chutes, the view being partly in section. Fig. 7 is an enlarged detail section showing the plan of certain driving gear used in connection with this invention.

The potato digger provided is of any of the usual forms such as are provided with the shovel 10 elevating mechanism 11 and supporting wheels 12. The elevating mechanism 11 is furthermore provided with the delivery fingers 13 arranged at its upper end so that potatoes dug by the machine will pass up the elevating mechanism and fall at the rear of the machine from said fingers. The attachment comprises a frame 14 which is connected in any suitable manner to the frame of the digger. Extending upward from the forward end of this frame are arms 15 provided with rearwardly extending horizontal portions 16 said horizontal portions uniting to support a collar 17 wherein is carried a bearing 18 the latter being held in the collar to swing in a vertical plane transverse the frame. This bearing 18 is provided with trunnions 19 which are held in suitable openings formed in the collar 17 for the purpose of permitting this lateral movement. Extending downward through the bearing 18 is a substantially vertical shaft 20 which has its lower end carried in a bearing 21 formed in a transverse member 22 supported on the frame 14 and guided for transverse longitudinal movement by means of guides 23. To one end of the member 22 is secured a handle 24 and to this handle is pivoted a bar 25 provided with spaced pairs of projections 26 extending upwardly from the bar 25 and so arranged that the guide embraces the bar and is adapted for engagement between the projections of any pair. The bar 25 is normally held with its free end raised by means of a coiled spring 27 one end of which bears against the under side of said bar while the remaining end engages the upper side of the member 22. By means of this arrangement the lower end of the shaft 20 may be moved from one side to the other of the frame within the limits of movement of the transverse bar 22.

Fixed upon the shaft 20 is a collar 28. Above this collar 28 and resting thereon is a cleaning screen which comprises a hub 29 having radial bars 30 extending therefrom, these bars 30 being preferably termed spoke bars. The screen is also provided with arcuate bars concentrically arranged and extending through about three-quarters of a circle as indicated at 31. These arcuate bars are preferably termed sifter bars and have their respective ends terminating at two adjacent spoke bars 30 so that a sectorial opening 32 is formed in the floor of said screen. The hub 29 is freely rotatable with respect to the shaft 20 so that the screen may be revolved about the shaft to bring the sectorial opening to one side or the other of the frame as may be desired. This screen is furthermore provided with a guard ring 33 which is co-extensive with the outermost sifter bar so that an opening is provided between the ends of the guard ring, the opening corresponding in position to the sectorial opening in the floor of the screen. This screen is normally held from rotation with respect to the frame by means of a hook member 34 which is pivoted to a portion of the frame and is adapted to engage one of two headed pins 35 projecting from the guard rim 33. When thus held it will be obvious that the shaft may rotate without rotating the screen. On the shaft 20 is also mounted a sleeve 36 wherefrom radiate lower conveyer arms 37 which lie relatively close to the screen and work therefrom as the shaft is rotated, and upper conveyer arms 38 which are spaced above the screen at such distance that the tops of the potato plants are held thereby so that the plant is carried around over the screen in substantially the position it occupies during growth. To this end the arms 38 are arranged quite close together while the arms 37 are spaced farther apart. Furthermore, in order that the plants may be delivered above the screen in the proper position a pair of arms 39 are provided which are attached to the frame just above the fingers 13 and in these arms is carried a rod 40 which extends horizontally across said fingers. When the potatoes pass up the elevator the bar 40 engages the tops and holds them so that the tubers drop down from the fingers 13 before the tops are allowed to leave said fingers.

For the purpose of insuring the disengagement of the tops from the conveyer arms so that they may drop through the sectorial opening 32 certain beater mechanism is employed. This beater mechanism comprises a substantially U-shaped frame 41 the legs of which are provided with openings to receive the shaft 20. Within this frame of the shaft 20 is mounted a beveled gear 42 which meshes with a beveled gear 43 carried on a crank shaft 44 upon the crank arms of which are fixed resilient beater members 45. In order to support the outer end of the shaft 44 there is provided at each end of the guard rim 33 an upwardly extending bearing bracket 46 wherein said outer end may be journaled, it being observed that as the sectorial opening is moved from one side of the machine to the other the outer end of the crank shaft will be shifted from one of these bearings to the other so that the beater may at all times occupy the proper position to the rear of said sectorial opening.

On the forward end of the frame 14 is journaled a transverse shaft 47 on which are gear wheels 48 meshing with gear wheels 49 each fixed to one of the supporting wheels 12 of the potato digger. To the rear of the shaft 20 is a second transverse shaft 50 and the shafts 50 and 47 are operatively connected by a chain 51 running from sprockets 52 fixed to said shafts. On the shaft 50 is also provided a pair of inwardly facing skew beveled gears 53 with which is adapted to mesh a similar gear 54 fixed upon the shaft 20, the gear 53 with which the gear 54 meshes being determined by the position of the transverse member 22. By means of this arrangement the conveyer mechanism may be driven in either direction in accordance with the position in which the sectorial opening is placed and at the same time the reversal of movement of the conveyer will reverse the movement of the beater so that the latter will always have the proper relative movement to the conveyer and screen.

The screen is provided with diametrically disposed delivery openings 55, said openings being arranged at right angles to the sectorial openings and depending from the bottom of the screen on each side of the openings 55 is a triangular plate 56 constituting a chute side and provided with an inwardly turned lip 57 on its bottom edge. These plates are so arranged that the apices of the triangles are all directed inward.

Hinged to the bottom of the screen adjacent each of the openings 55 is a chute bottom 58 which is of such size as to completely close the opening 55 adjacent which it is hinged when said bottom has its free end raised. For the purpose of holding the free ends of these chute bottoms in the raised position suitable latches 59 are provided which may be of any preferred construction. By this means it will be observed that the member 58 performs the dual function of a chute bottom and a gate or closure for this opening 55.

For the purpose of conveying the potatoes to one side or the other of the machine so that they may be bagged and for the purpose of removing any remaining dirt from the potatoes previous to the bagging of the potatoes a transverse conveyer is provided. This transverse conveyer comprises a pair of parallel shafts 60 supported on the frame 14, there being one shaft at each side of said frame. On each of these shafts is a pair of spaced frusto-conical drums, so arranged that their minor bases are adjacent, said drums being indicated at 61. Each of these drums has a peripheral flange 62 at each end and conveyer belts 63 run from these drums from one side of the machine to the other. In order to actuate this conveyer one of the shafts 60 is provided with a beveled gear 64 which meshes with a beveled gear 65 carried on a shaft 66. On this shaft 66 is a second beveled gear 67 which meshes with a beveled gear 68 fixed upon the shaft 50.

For the purpose of providing a seat for the operator of the machine there is used a wheel supported auxiliary frame 69 adapted for detachable attachment to the frame 14 and on this frame 69 is carried a driving seat 70.

In the operation of this device the cleaning screen is so positioned that a sectorial opening is toward the side of the field which has been worked, or in starting operations toward the outside of the field. As the machine is driven along the row of plants the potatoes are picked up, carried by the elevator and dropped on the cleaning screen. The conveyer is arranged to rotate in such direction that the plants and potatoes are first moved away from the sectorial opening and then toward the same. By this arrangement the screen is tilted so that the sectorial opening lies on the lower side of the tilted screen. As the conveyer carries the potatoes and plants around the screen the latter becomes detached from the tubers while these tubers are rolled over and over and the adhering earth almost entirely removed. Upon reaching the delivery opening at the rear the potatoes fall down this opening while the plants are carried beyond the opening by means of the close arrangement of the upper conveyer fingers. When the plants have reached the beater mechanism the latter acts to disengage the plants from the fingers so that the plants drop through the sectorial opening, the dirt from the potatoes having previously dropped through the meshes of the screen. Meanwhile the potatoes themselves have passed down the delivery chute and dropped upon the belts of the transverse conveyer. On this conveyer any remaining earth becomes detached and by reason of the spaced arrangement of the synclinal belts the earth rolls down and drops upon the ground while the now thoroughly cleaned potatoes are carried to the end of the conveyer and there received in a suitable bag or basket supported in any desired manner in the delivery end of said conveyer. Upon reaching the end of a row the machine is turned around and the screen conveyer mechanism and delivery chutes reversed in position so that the plants are always dropped toward that side of the machine that is already worked. This operation is, of course, repeated until the entire field has been covered.

There has thus been provided a simple and efficient device of the kind described and for the purpose specified.

It is obvious that many minor changes may be made in the form and construction of this invention without departing from the material principles thereof. It is not therefore desired to confine the invention to the exact form herein shown and described but it is wished to include all such as come within the scope of the appended claims.

Having thus described the invention what is claimed as new, is;—

1. In a device of the kind described, a frame, a cleaning screen having a guard rim extending partly therearound to provide an opening, a shaft journaled on said frame and supporting said screen, said screen being rotatable on said shaft and with respect to said frame, releasable molding means to lock said screen in adjusted positions relative to the frame, and shifting means for one end of said shaft whereby the shaft may be tilted and the screen inclined toward said opening.

2. In a device of the kind described, a frame, a cleaning screen having a guard rim extending partly therearound to provide an opening, a shaft journaled on said frame and supporting said screen, means to hold said screen from movement relative to the frame, an arm journaled on said shaft, bearings on opposite sides of said opening, a second shaft having one end journaled to said arm and the other end carried in one of said bearings, conveyer arms carried by the first mentioned shaft and rotatable over said screen, gears connecting said shafts, and beaters carried by the second shaft and moving transversely of the paths of said conveyer arms.

3. In a device of the kind described, a frame, a bearing carried by said frame and mounted for rocking movement transversely of the frame, a bar carried on said frame and extending transversely of the frame beneath said bearing, said bar being movable longitudinally, a releasable latch mechanism to hold said bar in adjusted position relative to the frame, a foot step bearing on said bar, a shaft journaled in said bearings, a cleaning screen rotatably mounted on said shaft, means to hold said screen from rotation with respect to the frame, a transverse shaft journaled on said frame adjacent the lower end of the first mentioned shaft, a pair of gears on said transverse shaft, a gear on said first mentioned shaft engaging a respective one of said pair of gears, a series of conveyer arms carried by the first mentioned shaft above said screen, and a guard rim extending partly around the cleaning screen, the ends of said guard rim being spaced to provide a delivery opening.

4. In a device of the kind described, a frame, a bearing carried by said frame and mounted for rocking movement transversely of the frame, a bar carried on said frame and extending transversely of the frame beneath said bearing, said bar being movable longitudinally, a releasable latch mechanism to hold said bar in adjusted position relative to the frame, a foot step bearing on said bar, a shaft journaled in said bearings, a cleaning screen rotatably mounted on said shaft, means to hold said screen from rotation with respect to the frame, a transverse shaft journaled on said frame adjacent the lower end of the first mentioned shaft, a pair of gears on said transverse shaft, a gear on said first mentioned shaft engaging a respective one of said pair of gears, a series of conveyer arms carried by the first mentioned shaft above said screen, and a guard rim extending partly around the cleaning screen, the ends of said guard rim being spaced to provide a delivery opening; in combination with a beater mechanism operatively connected to the first mentioned shaft, and supporting means for said beater mechanism adapted to hold said mechanism on either side of the opening in the guard rim.

5. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, and other means to tilt the screen toward the side of the frame at which the opening is positioned.

6. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, other means to tilt the screen toward the side of the frame at which the opening is positioned and a reversible conveyer operating over said screen.

7. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, other means to tilt the screen toward the side of the frame at which the opening is positioned, a pair of delivery chutes leading from the screen and arranged substantially at right angles to the opening in the guard rim, gates each arranged to close a respective delivery chute, and a reversible conveyer operating over said screen.

8. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, other means to tilt the screen toward the side of the frame at which the opening is positioned, a pair of delivery chutes leading from the screen and arranged substantially at right angles to the opening in the guard rim, gates each arranged to close a respective delivery chute, a reversible conveyer operating over said screen, a transverse conveyer extending across said frame beneath the open delivery chute, and mechanism to operate said conveyers.

9. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, a beater mechanism, supporting means for said beater mechanism on each side of said opening; a reversible conveyer operating over said screen, and an operative connection between the conveyer and beater mechanism.

10. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, a beater mechanism, supporting means for said beater mechanism on each side of said opening, a reversible conveyer operating over said screen, an operative connection between the conveyer and beater mechanism, a pair of delivery chutes leading from the screen and arranged substantially at right angles to the opening in the guard rim, and gates controlling said chutes.

11. In a device of the kind described, a frame, a substantially horizontal cleaning screen mounted for rotation on said frame, a guard rim carried on said screen and provided with an opening, means to hold said screen adjustably from rotation on said frame whereby said opening may be positioned on either side of the frame, a beater mechanism, supporting means for said beater mechanism on each side of said opening; a reversible conveyer operating over said screen, an operative connection between the conveyer and beater mechanism, a pair of delivery chutes leading from the screen and arranged substantially at right angles to the opening in the guard rim, gates controlling said chutes, a transverse conveyer extending across said frame and below the path of the delivery end of said chutes, and mechanism to operate said conveyers simultaneously.

In testimony whereof, I affix my signature, in presence of two witnesses.

BRET H. POTTER.

Witnesses:
ARDROE POTTER,
LEO F. GRANT.

Copies of this patent may be obtained for five cents each, by addressing the "Commissioner of Patents, Washington, D. C."